(12) United States Patent
Maiorana

(10) Patent No.: US 10,351,055 B2
(45) Date of Patent: Jul. 16, 2019

(54) DEPLOYABLE ALARMING AND SAFETY ZONE FOR USE WITH A TANKER DELIVERY

(71) Applicant: MAC LTT, INC., Kent, OH (US)

(72) Inventor: James A. Maiorana, Hartville, OH (US)

(73) Assignee: MAC LTT, INC., Kent, OH (US)

( * ) Notice: Subject to any disclaimer, the term of this patent is extended or adjusted under 35 U.S.C. 154(b) by 0 days.

(21) Appl. No.: 15/620,231

(22) Filed: Jun. 12, 2017

(65) Prior Publication Data

US 2018/0354414 A1 Dec. 13, 2018

(51) Int. Cl.
| | |
|---|---|
| *B60Q 1/48* | (2006.01) |
| *B60Q 5/00* | (2006.01) |
| *B60Q 1/26* | (2006.01) |
| *B60Q 1/50* | (2006.01) |
| *G08G 1/16* | (2006.01) |
| *B60P 3/22* | (2006.01) |

(52) U.S. Cl.
CPC ........... *B60Q 1/486* (2013.01); *B60Q 1/2661* (2013.01); *B60Q 1/2692* (2013.01); *B60Q 1/50* (2013.01); *B60Q 5/00* (2013.01); *G08G 1/166* (2013.01); *G08G 1/168* (2013.01); *B60P 3/22* (2013.01); *G08G 1/165* (2013.01)

(58) Field of Classification Search
CPC ........ B60Q 1/486; B60Q 1/50; B60Q 1/2692; B60Q 1/2661; B60Q 5/00; B60Q 1/0017; B60Q 1/0023; B60Q 1/0029; B60Q 1/0035; B60Q 1/0041; B60Q 1/26; B60Q 1/2657; B60Q 1/30; B60Q 1/32; B60Q 1/48; B60Q 1/484; B60Q 1/52; B60Q 5/005; B60Q 5/006; G08G 1/168; G08G 1/166; G08G 1/165; B60R 1/00; B60P 3/22

See application file for complete search history.

(56) References Cited

U.S. PATENT DOCUMENTS

| | | |
|---|---|---|
| 4,311,208 A | 1/1982 | Macrorie et al. |
| 4,371,056 A | 2/1983 | Anglade |
| 4,679,657 A | 7/1987 | Bennett et al. |
| 4,825,192 A | 4/1989 | Wells |
| 4,848,517 A | 7/1989 | Broyles, III |
| 5,971,105 A | 10/1999 | Jacobson |

(Continued)

*Primary Examiner* — Ryan W Sherwin
(74) *Attorney, Agent, or Firm* — Sand, Sebolt & Wernow Co., LPA

(57) ABSTRACT

A deployable safety zone system includes at least a first arm mounted on a support member and being movable between stored and operating positions relative to the support member. The support member and first arm define a safety zone between then when the first arm is in the operating position. The safety system may include reflective mechanisms, light sources, and an alarming system. The alarming system may include a transmitter positioned on one part of the safety system, a receiver positioned on another part of the safety system and an alarm mechanism. A signal may be sent between the transmitter and receiver and if that signal is interrupted, a visual or audible alarm may be generated. Alternatively, the deployable safety zone system may comprise a sensor assembly disposed adjacent the support member The alarmed safety zone is defined between the support member and the sensor assembly.

18 Claims, 13 Drawing Sheets

(56) References Cited

U.S. PATENT DOCUMENTS

| | | | |
|---|---|---|---|
| 6,213,047 B1 * | 4/2001 | Means | B60Q 1/2657 116/28 R |
| 6,739,349 B2 | 5/2004 | Kastenschmidt et al. | |
| 6,921,184 B2 | 7/2005 | Tufte | |
| 6,966,403 B1 | 11/2005 | Chandra | |
| 7,174,994 B1 | 2/2007 | Coffield et al. | |
| 7,690,858 B1 | 4/2010 | Chiavola | |
| 7,841,269 B1 * | 11/2010 | Jacobs | F41H 5/013 296/187.07 |
| 8,118,250 B1 | 2/2012 | Helseth et al. | |
| 8,740,267 B1 * | 6/2014 | Wilson | B60Q 1/32 116/28 R |
| 8,770,778 B2 | 7/2014 | Pereira et al. | |
| 9,694,883 B1 | 7/2017 | Bonventre | |
| 2004/0173406 A1 | 9/2004 | Lantz | |
| 2005/0173189 A1 | 8/2005 | Berardi | |
| 2010/0018800 A1 | 1/2010 | Ventura et al. | |
| 2010/0118557 A1 | 5/2010 | Ortwein et al. | |
| 2010/0224444 A1 | 9/2010 | Simeonov et al. | |
| 2011/0148645 A1 | 6/2011 | Sarmiento | |
| 2011/0202161 A1 * | 8/2011 | Krieger | B65H 26/00 700/108 |
| 2013/0140111 A1 | 6/2013 | Desai | |
| 2013/0235558 A1 | 9/2013 | Zhou | |
| 2013/0265784 A1 | 10/2013 | Nieberle | |
| 2013/0313978 A1 | 11/2013 | Fields et al. | |
| 2014/0016338 A1 | 1/2014 | Yang | |
| 2014/0041964 A1 | 2/2014 | Bedyk | |
| 2014/0056013 A1 | 2/2014 | Hancock, Jr. et al. | |
| 2014/0353081 A1 | 12/2014 | Linch et al. | |
| 2015/0075908 A1 | 3/2015 | Moss et al. | |
| 2015/0241034 A1 | 8/2015 | Dankelmann et al. | |
| 2016/0230461 A1 | 8/2016 | Finegan | |
| 2016/0273744 A1 | 9/2016 | Stout | |
| 2016/0281885 A1 | 9/2016 | Shearer et al. | |
| 2016/0305619 A1 | 10/2016 | Howe | |
| 2016/0360593 A1 | 12/2016 | Lee | |
| 2017/0068303 A1 | 3/2017 | Land et al. | |
| 2017/0188439 A1 | 6/2017 | Martinez | |
| 2017/0232930 A1 * | 8/2017 | Murar | B60R 25/24 340/5.61 |
| 2017/0241203 A1 | 8/2017 | Elnore | |
| 2017/0314328 A1 | 11/2017 | Friedman | |
| 2017/0344097 A1 | 11/2017 | Land et al. | |
| 2017/0350584 A1 | 12/2017 | Hulet et al. | |

* cited by examiner

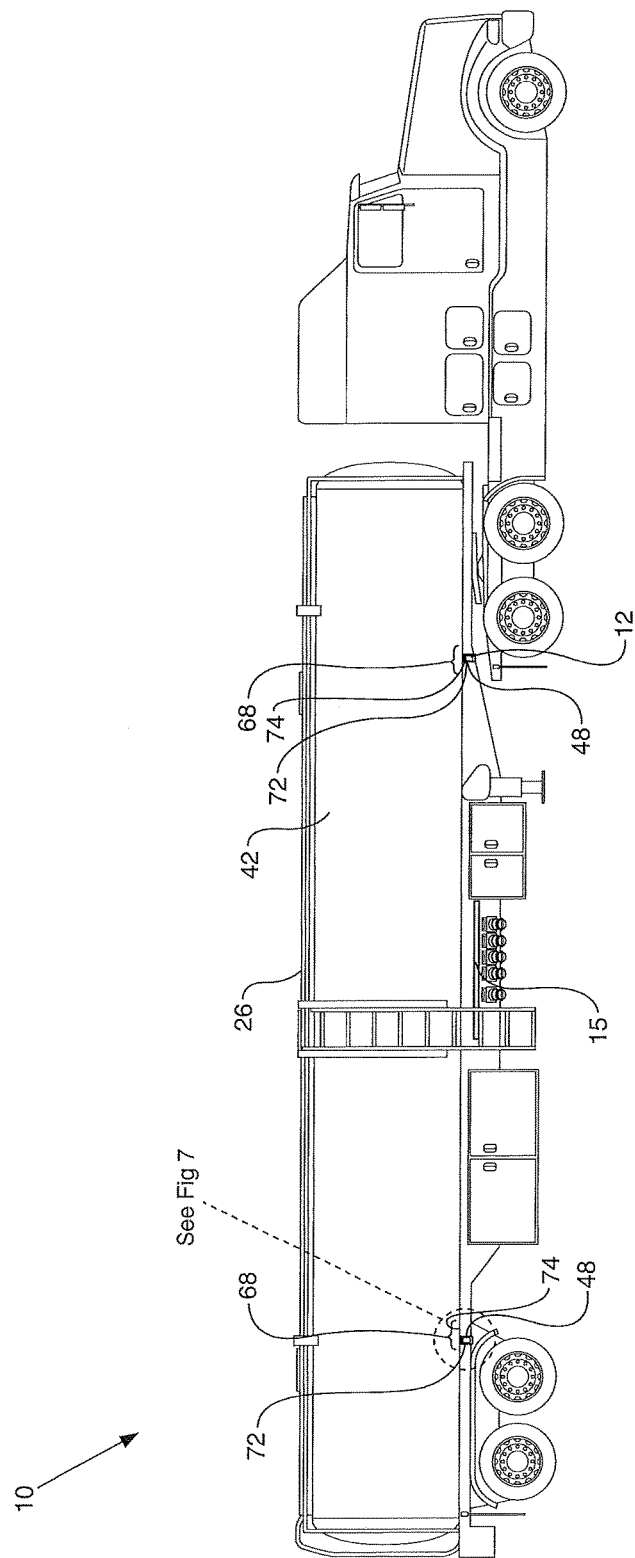

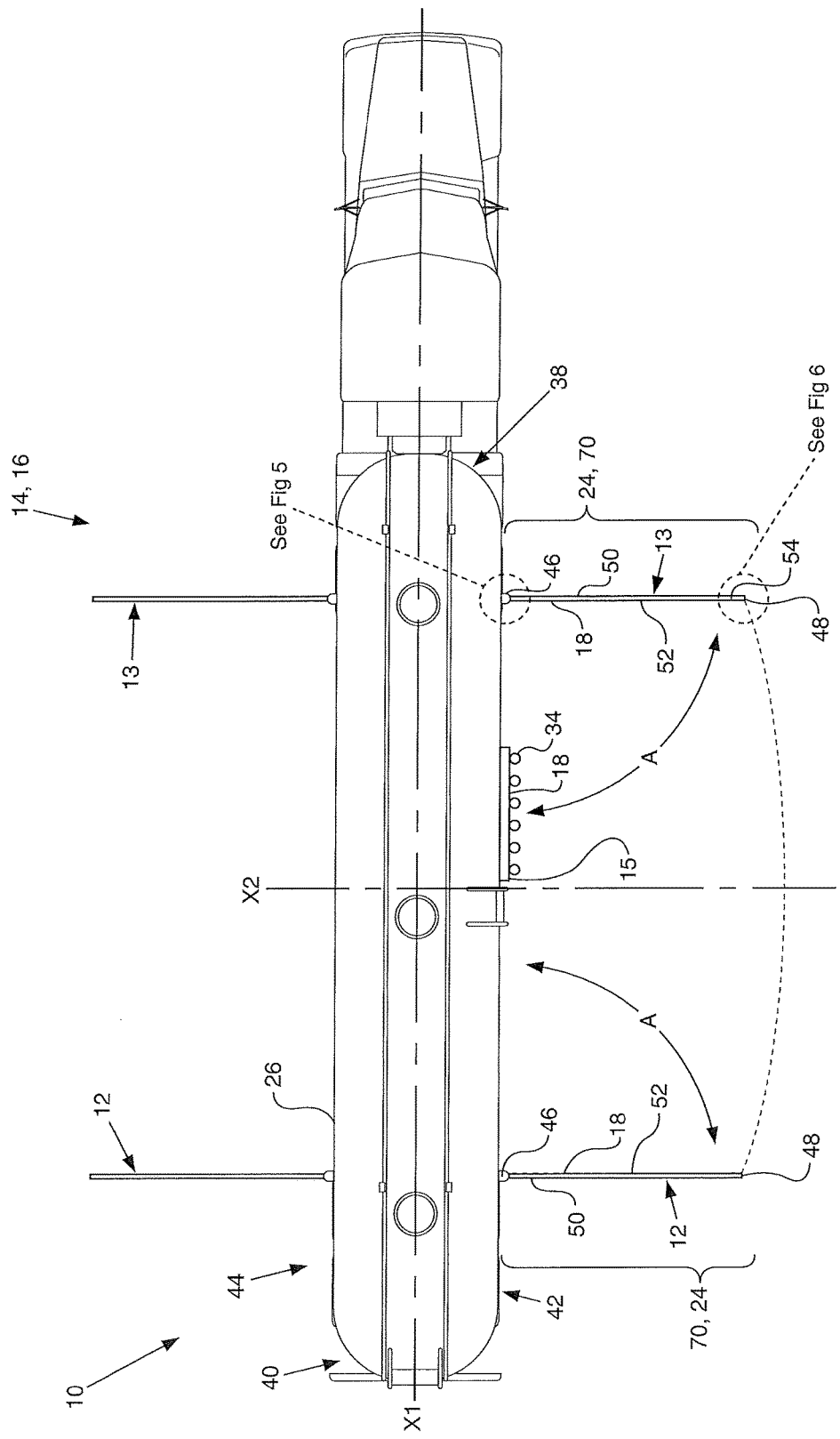

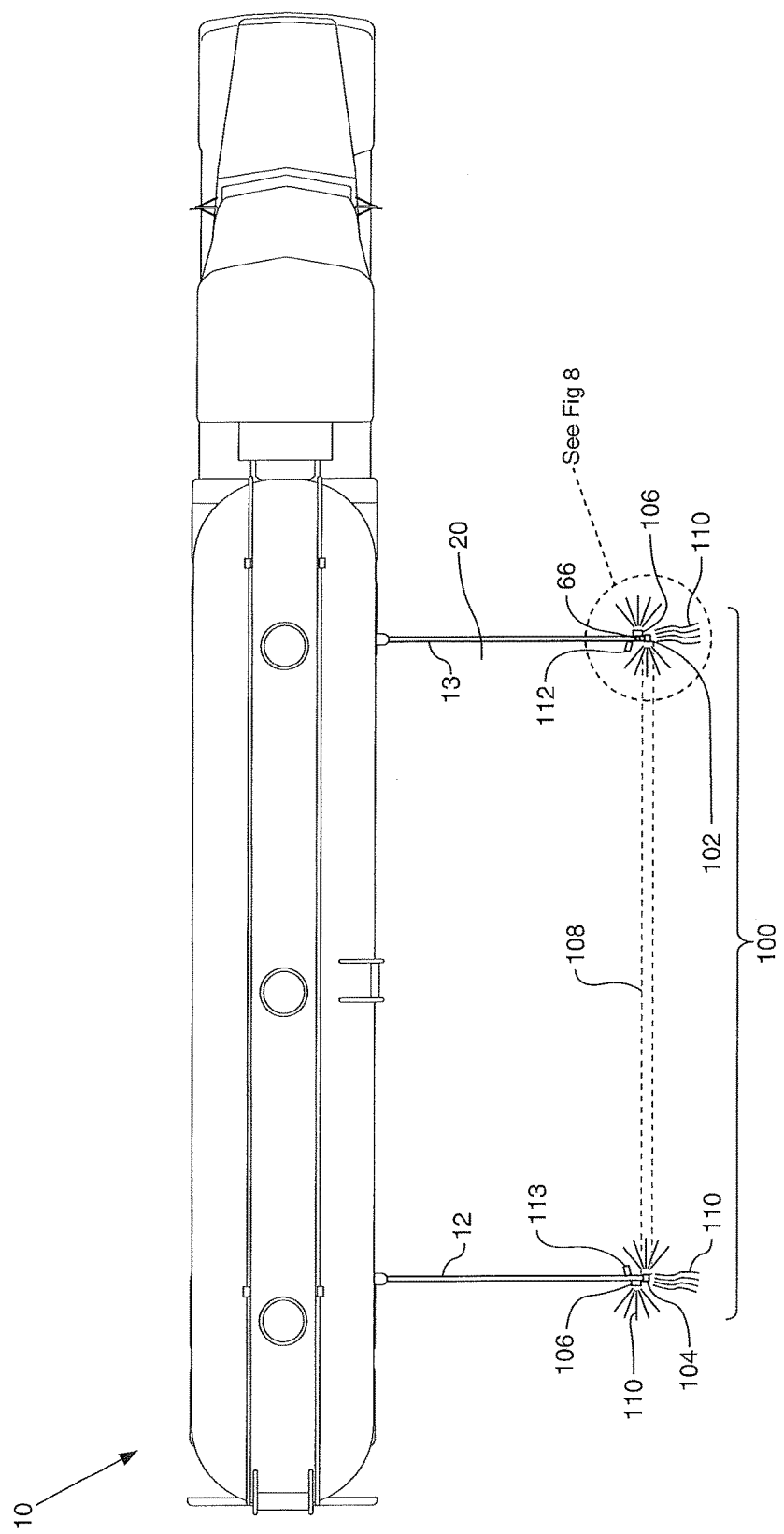

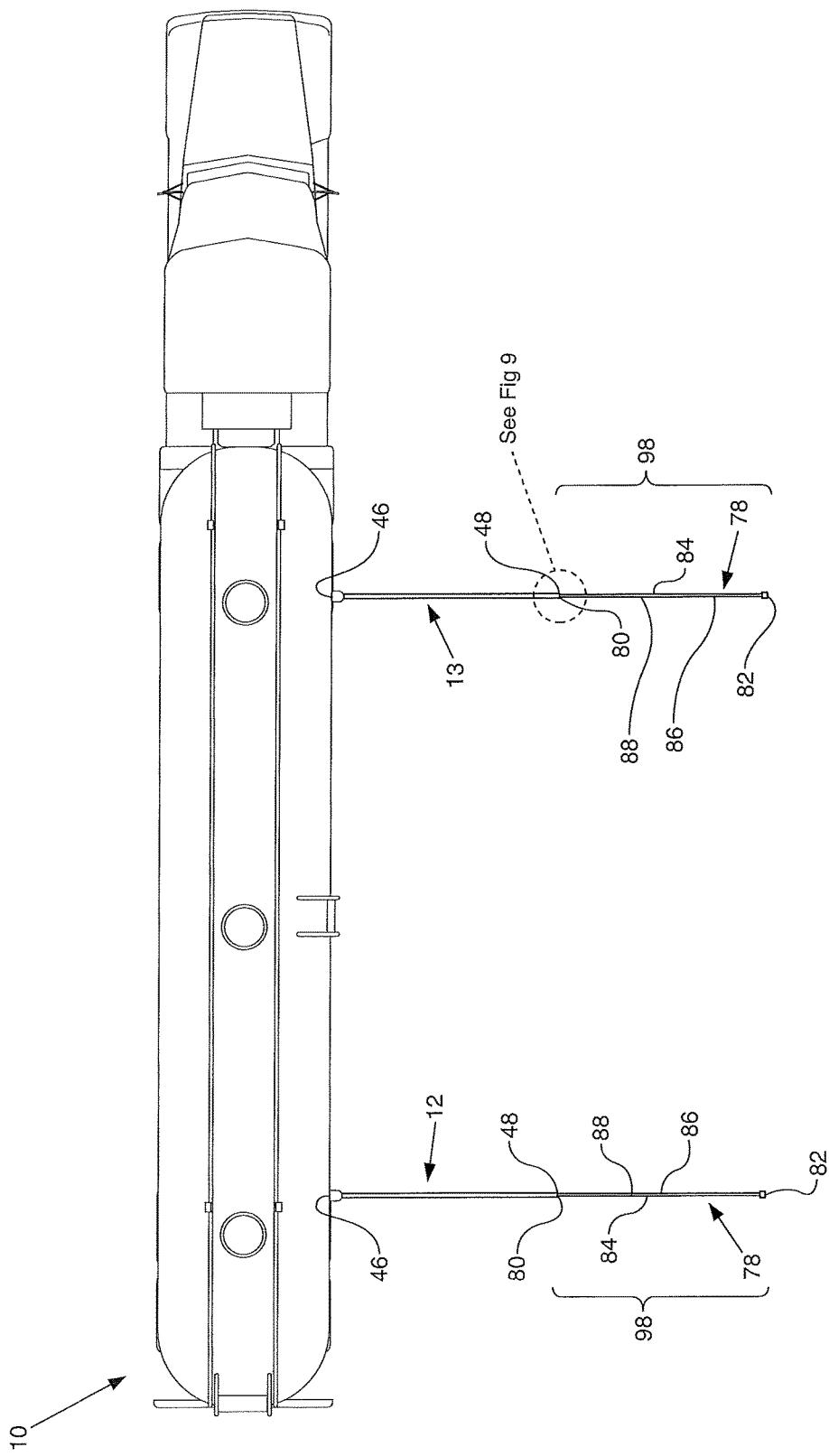

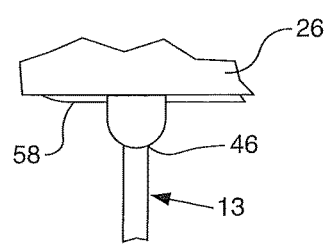
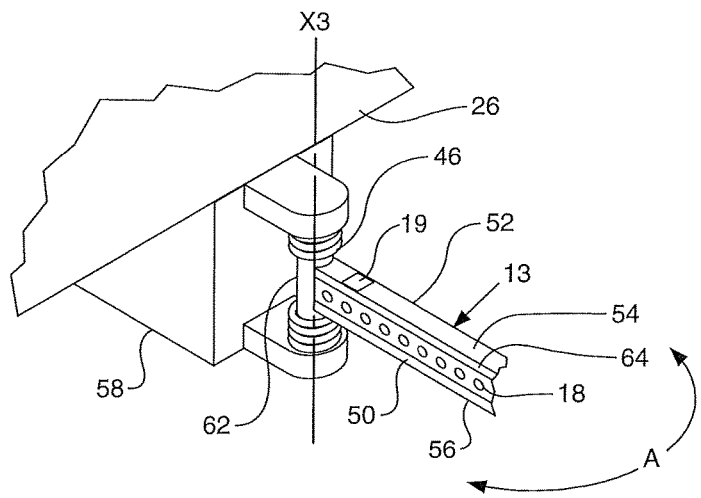
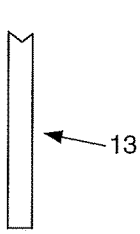
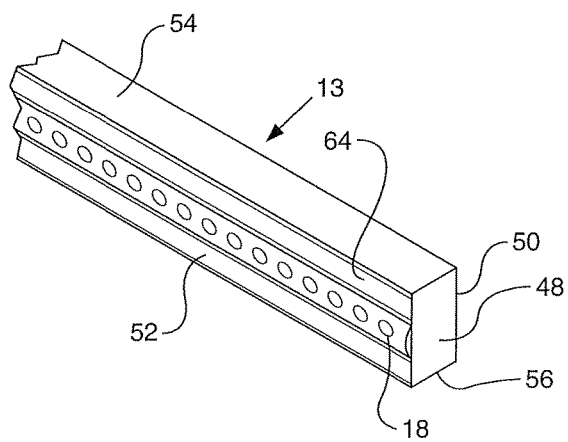
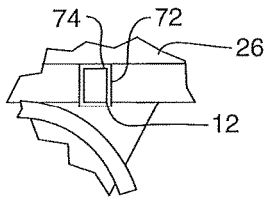
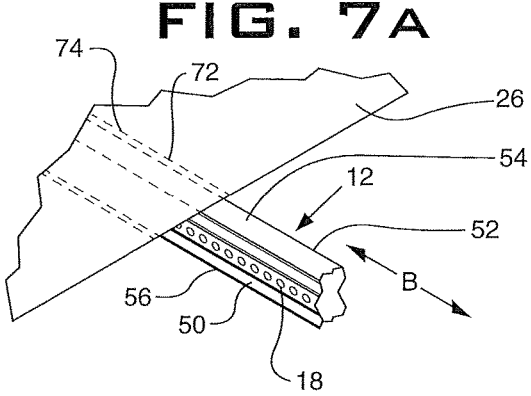

DEPLOYABLE ALARMING AND SAFETY ZONE FOR USE WITH A TANKER DELIVERY

BACKGROUND

Technical Field

The present disclosure relates generally to trucks and trailers. More particularly, the present disclosure relates to alarming and safety systems for use on a truck or trailer. Specifically, the present disclosure is directed to an alarming and safety system that is operably connected to the truck or trailer to create an alarming and safety zone.

Background Information

Operators of cargo-carrying trucks, including tanker trucks, often have to make various stops along their routes to perform various tasks. One exemplary task that an operator of a tanker truck may perform is the transfer of gasoline from a fuel tanker truck to gasoline storage tanks at a gas station. This task is typically performed at night and there is therefore a risk that an operator standing next to his or her truck may not be visible to drivers entering the gas station. The operator may therefore be accidentally hit by a car driving past where the operator is working. Additionally, operating fuel nozzle assemblies and machinery required to transfer gas from the fuel tanker to the gas station tanks tends to require the operator's full attention. Since their attention is diverted, the operators that perform this task may be at risk of being robbed because they may not be fully aware of their surroundings and because it is dark.

SUMMARY

The inventor has recognized that it is important to provide safety systems for a truck operator while working on the ground next to their truck and, most particularly, to provide safety systems that will tend to increase the safety of truckers when performing tasks that may divert their attention from their surroundings.

The present disclosure offers both a system and method for increasing the safety of truck operators while working next to their trucks.

A deployable safety zone system and method of use disclosed herein includes at least a first arm mounted on a support member and being movable between stored and operating positions relative to the support member. The support member and first arm define a safety zone between them when the first arm is in the operating position. The safety system may include reflective mechanisms, light sources, and an alarming system. The alarming system may include a transmitter positioned on one part of the safety system, a receiver positioned on another part of the safety system and an alarm mechanism. A signal may be sent between the transmitter and receiver and if that signal is interrupted, a visual or audible alarm may be generated.

In one aspect, the present disclosure may provide a deployable safety zone system comprising a support member and a first arm mounted to the support member. The first arm is movable between a stored position and an operating position. The support member and the first arm define a safety zone between them while the first arm is in the operating position. The support member may be a truck or a truck trailer and the first arm may be pivotally or slidably engaged with a side of the truck or truck trailer. In another aspect, the system may include a second arm mounted to the support member and the safety zone may be defined between the first and second arms and the support member when the first and second arms are in the operating position.

In another aspect, the present disclosure may provide a method for creating a deployable safety zone comprising providing a support member; mounting a first end of a first arm to the support member; moving the first arm from a stored position to an operating position. The method further includes creating a safety zone between the support member and the first arm.

In another aspect, the present disclosure may provide a deployable alarming and safety zone system comprising a support member and a first arm mounted to the support member. The first arm is movable between a stored position and an operating position. The system further comprises an alarming system provided on at least one of the first arm and the support member. The support member, first arm and the alarming system define an alarmed safety zone while the first arm is in the operating position. In another aspect, the system may include a second arm mounted to the support member and the safety zone may be defined between the first and second arms and the support member when the first and second arms are in the operating position. The alarming system may include a transmitter mounted on the first arm, a receiver mounted on the second arm and an alarm mechanism that is operatively engaged with the receiver. The alarm mechanism may include a light source and a sound generating device to warn the operator that the safety zone has been entered by unauthorized persons.

In another aspect, the present disclosure may provide a method for creating a deployable alarming and safety zone comprising providing a support member and deploying an alarmed safety zone adjacent the support member. The method further comprises mounting a first end of a first arm to the support member; moving the first arm from a stored position to an operating position. The method further comprises providing an alarming system on one of the first arm and the support member and arming the alarming system as the first arm is moved from the stored position to the operating position. The method may further comprise transmitting a signal from a transmitter on the support member or first arm to a receiver on the other of the support member or first arm. The method may further comprise emitting a sound or flashing a light from the alarming system if the signal from the transmitter to the receiver is broken by an unauthorized person crossing into the alarmed safety zone. The method may further comprise arming the alarming system when the first arm is moved to the operating position and disarming the alarming system when the first arm is moved back to the stored position.

In another aspect, the present disclosure may provide a deployable alarming and safety zone system comprising a truck and an alarming system. The alarming system defines an alarmed safety zone disposed adjacent the truck. In another aspect, the alarming system may include a sensor assembly operatively coupled with the truck and an alarm mechanism operatively engaged with the sensor assembly. The alarmed safety zone may include a perimeter defined by the sensor assembly where the alarm mechanism activates when the sensor assembly detects an object crossing the perimeter. The system may include an identification device where the alarm mechanism activates when the identification device travels from within the perimeter to outside of the perimeter. The alarming system may include a first sensor assembly on the truck and a second sensor assembly positionable a distance away from the truck. The alarmed safety zone may extend between the first sensor assembly and the second sensor assembly.

In another aspect, the present disclosure may provide a method for creating a deployable alarming and safety zone comprising providing a support member and deploying an alarmed safety zone adjacent the support member. The method may further comprise providing a truck as the support member and providing an alarming system which defines a safety zone adjacent the truck. The method further comprises arming the alarming system. The method may further comprise generating an audible and/or visual warning and/or may transmit a notification to a third party when a sensor assembly detects an object crossing a perimeter of the safety zone defined by sensor assembly. The method may further comprise generating an audible and/or visual warning and/or may transmit a notification to a third party when a sensor assembly detects an identification device crossing from within the perimeter to outside of the perimeter. The method may further comprise providing a first sensor assembly mounted on the truck and a second sensor assembly positioned a distance away from the truck where the safety zone extends between the first sensor assembly and the second sensor assembly.

BRIEF DESCRIPTION OF THE SEVERAL VIEWS OF THE DRAWINGS

Sample embodiments of the present disclosure are set forth in the following description, are shown in the drawings and are particularly and distinctly pointed out and set forth in the appended claims.

FIG. 1B is a side elevational view of a tanker truck incorporating a second embodiment of the safety system in accordance with the present disclosure, showing the arms of the safety system slidably mounted to the tanker truck; and wherein the arms are shown in the stored position;

FIG. 2 is a top view of the tanker truck of FIG. 1A showing the arms in the operating position and showing a safety zone defined between a side of the tanker truck and the first and second arms;

FIG. 3 is a top view of the tanker truck of FIG. 1A showing the arms in the operating position and showing the alarming system thereof in an activated condition;

FIG. 4 is a top view of the tanker truck of FIG. 1A showing the arms in the operating position and showing an extension member of the safety system moved into an extended position;

FIG. 5 is an enlarged view of the highlighted region of FIG. 2 showing the mounting bracket engaged with a rail of the tanker trailer and showing the arm connected to the mounting bracket;

FIG. 5A is an enlarged partial perspective view of the highlighted region of FIG. 2 showing the mounting bracket engaged with a rail of the tanker trailer and showing the arm connected to the mounting bracket via the pivot pin;

FIG. 6 is an enlarged view of the highlighted region of FIG. 2 showing the arm;

FIG. 6A is an enlarged partial perspective view of the highlighted region of FIG. 2 showing the reflective mechanism and the LED strip provided on the arm;

FIG. 7 is an enlarged view of the highlighted region of FIG. 1B showing one sleeve that is provided on the tanker truck with the arm extending out of the sleeve;

FIG. 7A is an enlarged partial perspective view of the highlighted region of FIG. 1B showing one sleeve that is provided on the tanker truck with the arm extending out of the sleeve;

Similar numbers refer to similar parts throughout the drawings.

DETAILED DESCRIPTION

Figure 1A:
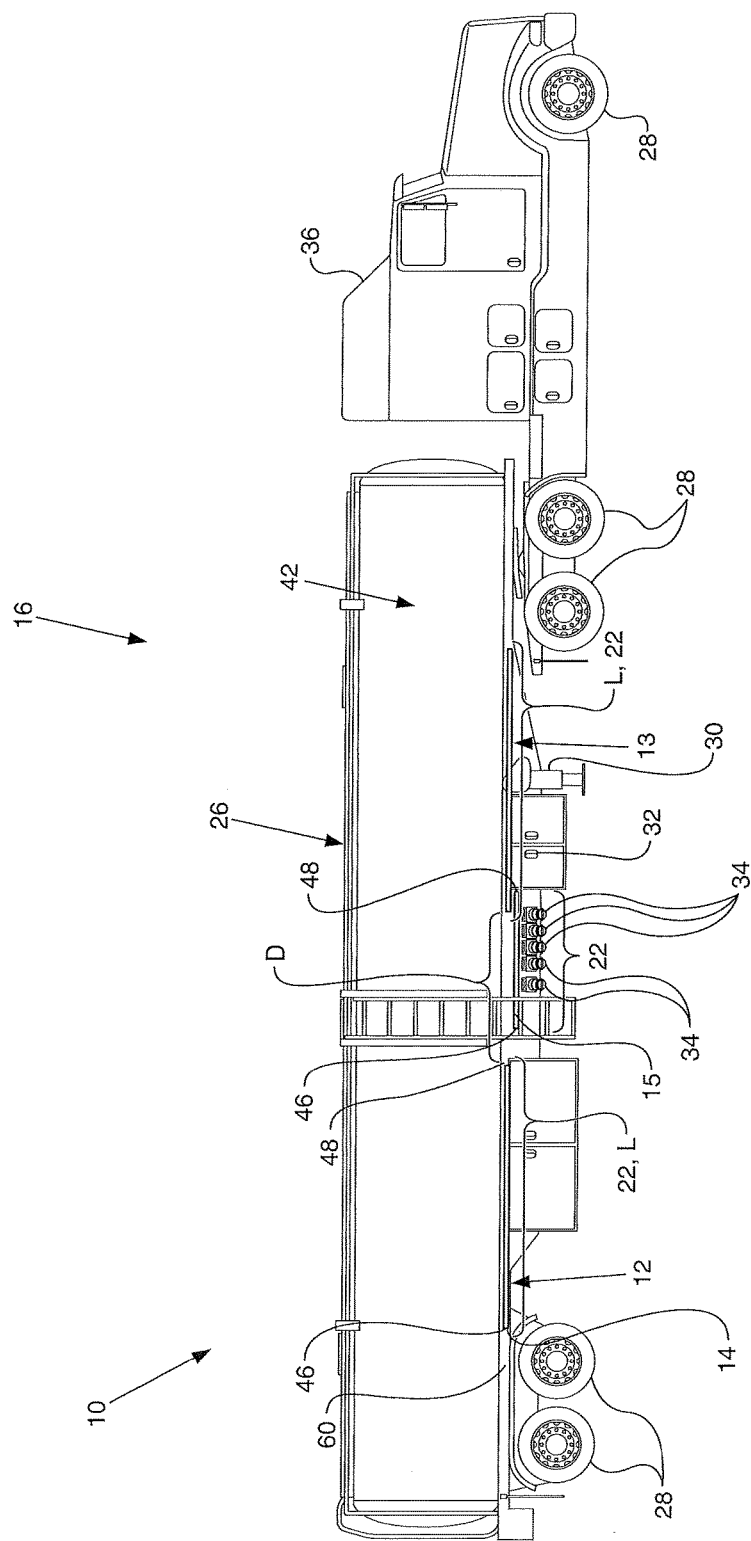
FIG. 1A is a side elevational view of a tanker truck incorporating a first embodiment of a safety system in accordance with the present disclosure, showing the arms of the safety system rotatably mounted to a side of the tanker truck and showing the arms in the stored position.

Referring to FIG. 1-FIG. 9A and FIG. 12-FIG. 13, there is shown a deployable alarming and safety zone system and method in accordance with the present disclosure. The system is generally indicated at 10. System 10 may include a first arm 12, a support member 14, such as a tanker truck 16, a light source 18 and an alarming and safety zone defined between first arm 12 and support member 14. The alarming and safety zone will be hereinafter referred to as safety zone 20. First arm 12 may be movable relative to support member 14 between a stored position 22 and an operating position 24 to create safety zone 20 between first arm 12 and support member 14. Although support member 14 has been referred to herein as a tanker truck 16, it will be understood that other suitable types of support members 14 may be utilized, including other types of vehicles, such as cargo-carrying trucks 116. Alternatively, any stationary structure, such as a wall, a loading door (not shown) of a warehouse, a post or any other object such as a fuel pump at a gas station could be provided with system 10 of the present disclosure.

Figure 10:
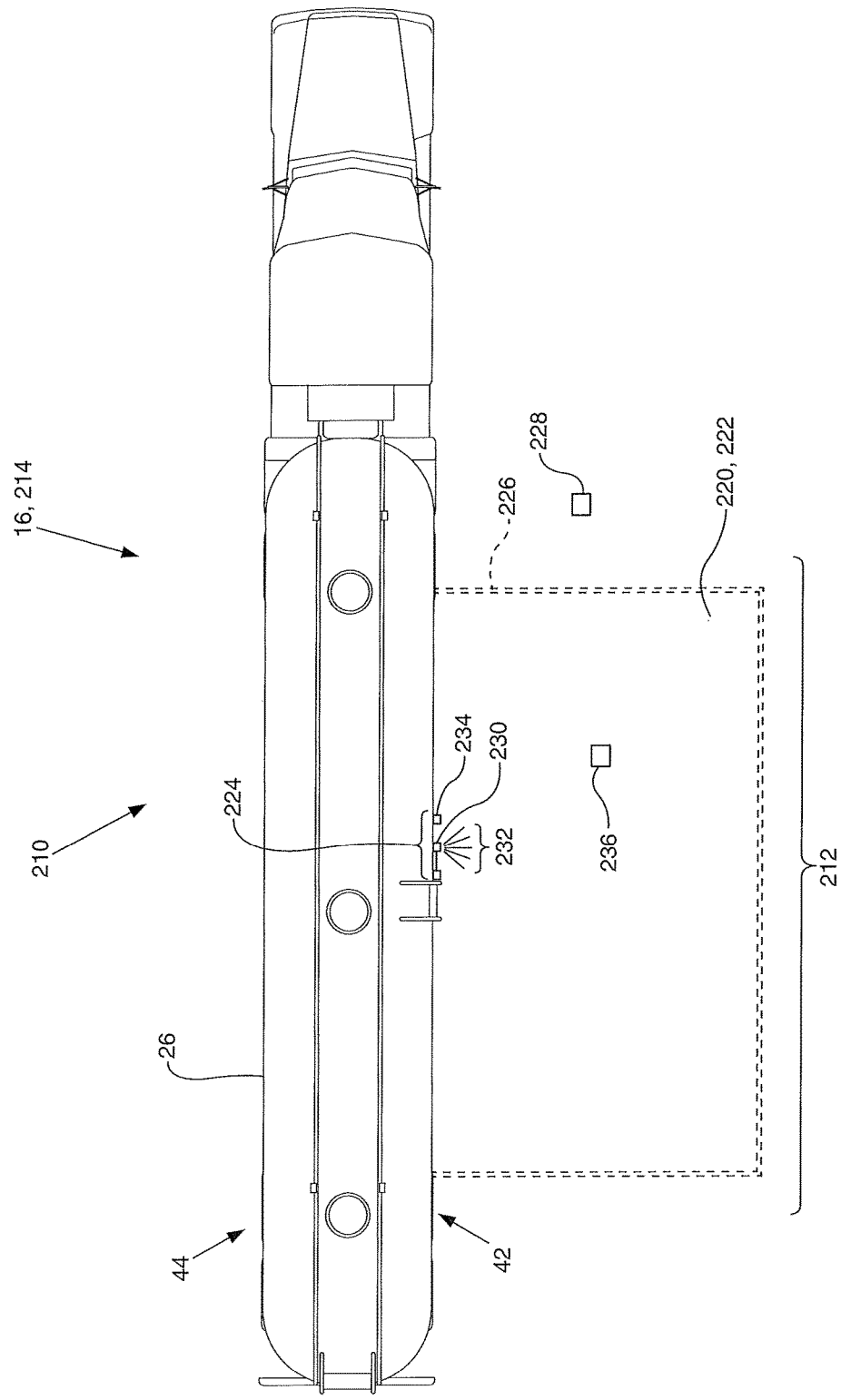
FIG. 10 is a top view of the tanker truck of FIG. 1A showing another embodiment of the alarming system which defines the safety zone adjacent the tanker truck.
Figure 11:
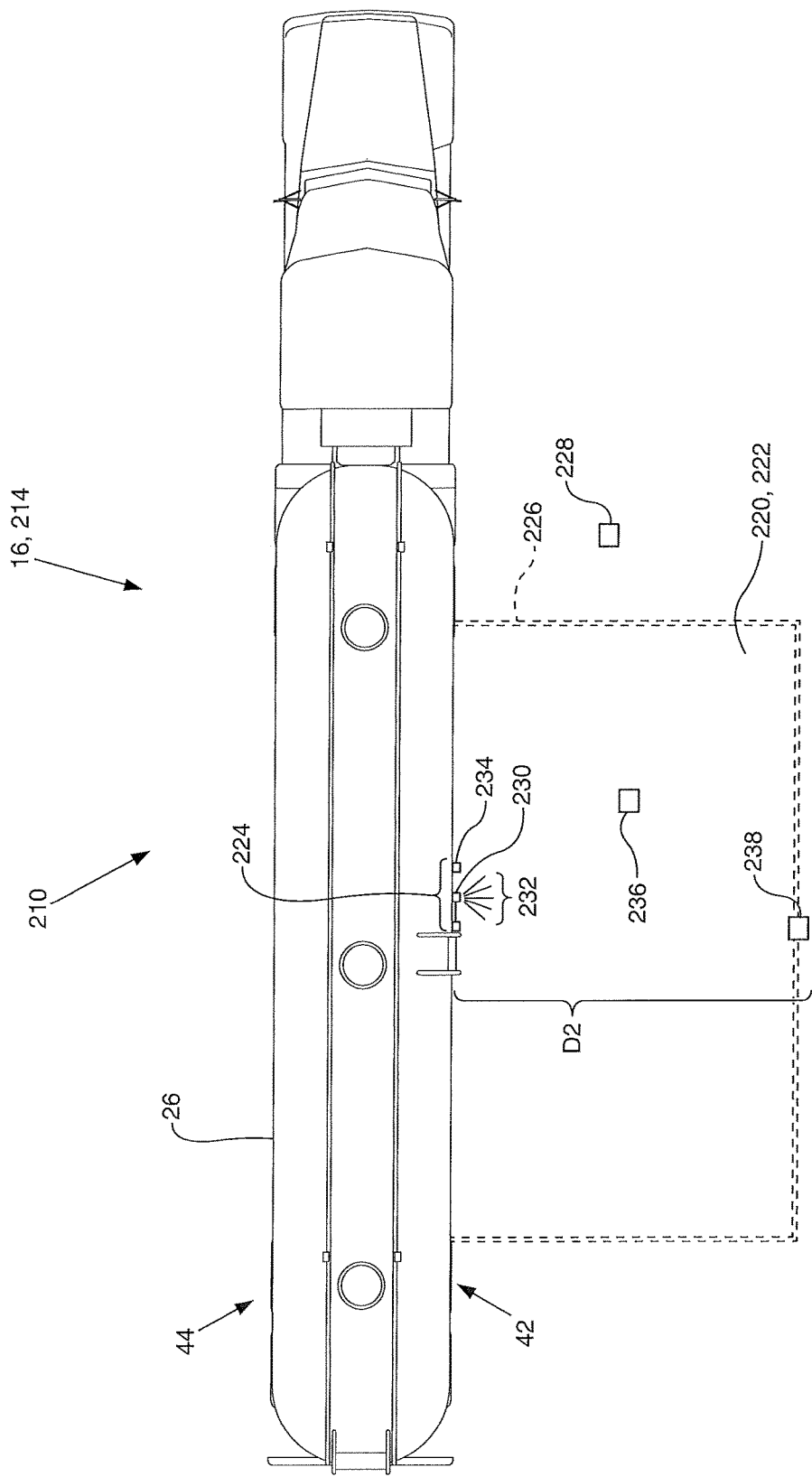
FIG. 11 is a top view of the tanker truck of FIG. 1A showing the alarming system and safety zone defined adjacent the tanker truck where the alarming system includes a first sensor assembly and a second sensor assembly.
Figure 14:
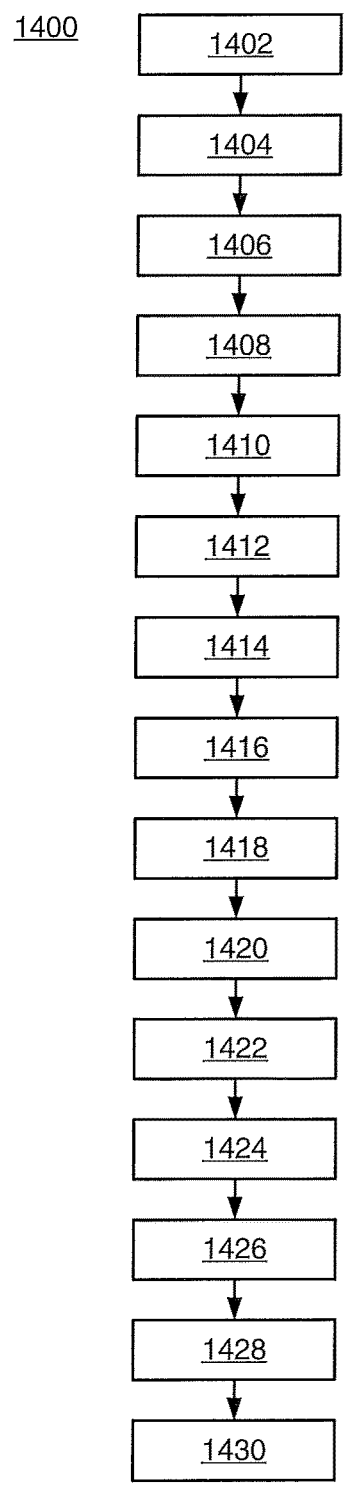
FIG. 14 is a flowchart depicting another exemplary method for creating the deployable alarming and safety zone.

Alternatively, and referring to FIG. 10, FIG. 11, and FIG. 14, there is shown another embodiment of a deployable alarming and safety zone system and method in accordance with the present disclosure. The system is generally indicated at 210. System 210 may include a support member 214, such as a tanker truck 16, and an alarming system 212. Alarming system 212 may define an alarming and safety zone 220, which is hereinafter referred to as safety zone 220, disposed adjacent tanker truck 16. Alarming system 212 may be operably coupled with tanker truck 16. Although support member 214 has been referred to herein as a tanker truck 16, it will be understood that other suitable types of support members 214 may be utilized, including other types of vehicles, such as cargo-carrying trucks 116. Alternatively, any stationary structure, such as a wall, a loading door (not shown) of a warehouse, a post or any other object such as a fuel pump at a gas station could be provided with system 210 of the present disclosure.

FIG. 1A shows system 10 disposed on tanker truck 16. Tanker truck 16 may be of a usual construction and may comprise an elongated, generally cylindrical tank 26, which is supported by one or more pairs of wheel assemblies 28. Tanker truck 16 may include components such as landing gear 30 along with various valves and other controls indicated generally at 32. Tanker truck 16 may also include a fuel nozzle assembly 34 that is provided on a side of tanker truck 16. The types of controls 32 and particular shape of tank 26 will be dependent upon the particular load to be transported within a hollow interior of tank 26. Hoses may be selectively engaged with fuel nozzle assembly 34 to transfer the contents of tanker truck 16 to storage tanks. A tractor or cab 36 may be engaged with the tank and may be utilized to provide a pulling force for moving tanker truck 16. As will be discussed later herein, FIG. 1A shows a first embodiment of safety system 10 engaged on tanker truck 16. FIG. 1B shows a second embodiment of safety system 10 disposed on tanker truck 16. System 10 may be provided on tanker truck 16 (on any of the left or right sides or the back of the tanker; or adjacent the left or right doors or the front of the cab 36) to define a safety zone 20 that may offer additional safety and protection to an operator working on the ground next to the tanker truck 16 or cab 36.

Figure 1C:
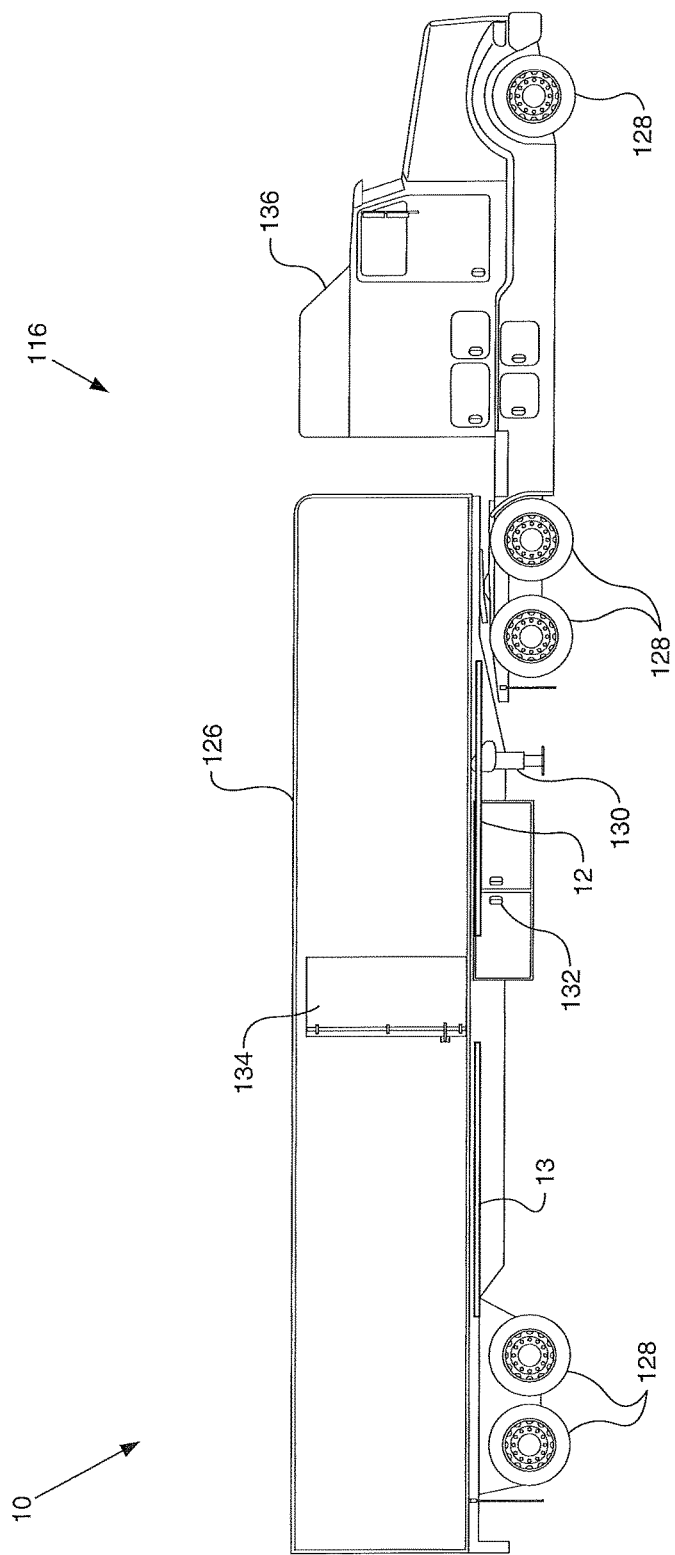
FIG. 1C is a side elevational view of a cargo-carrying truck incorporating the first embodiment of the safety system and showing the arms in the stored position.

FIG. 1C shows the first embodiment of system 10 disposed on cargo-carrying truck 116, although it will be understood that the second embodiment of system 10 may, alternatively, be provided on cargo-carrying truck 116. Cargo-carrying truck 116 may be of a usual construction comprising an elongated, generally rectangular trailer 126, which is supported by one or more pairs of wheel assemblies 128. Cargo-carrying truck 116 may include landing gear 130 along with various valves and other controls indicated generally at 132. Cargo carrying truck 116 may include a door 134 that provides access to a hollow interior of trailer 126. The types of components and controls 132 and particular shape of trailer 126 will be dependent upon the particular load to be transported within the interior of trailer 126. A tractor or cab 136 provides the pulling force for cargo-carrying truck 116. System 10 may be positioned to define a safety zone 20 around door 134 in order to provide safety and protection to an operator working on the ground adjacent door 134. It will be understood that system 10 may be provided on any part of cargo-carrying truck 116 where it is desired to provide additional safety and protection to an operator working on the ground next to the truck 116.

As shown in FIG. 2, tank 26 of tanker truck 16 includes a first end 38 and a second end 40 defining a longitudinal direction therebetween. First end 38 and second end 40 define a longitudinal axis X1 extending from first end 38 to second end 40. Tank 26 includes a first side 42 spaced apart from a second side 44 defining a transverse direction therebetween. First side 42 and second side 44 define a transverse axis X2 extending from first side 42 to second side 44. Axis X2 is oriented at right angles to axis X1.

System 10 is illustrated as being engaged on first side 42 of tank 26 but it will be understood that system 10 may alternatively or additionally be provided on second side 44 of tank 26 or at any other location on tanker truck 16 alongside which an operator may typically work on the ground. First arm 12 may be a generally elongated member that may be generally planar along its length or is of a square, rectangular or circular cross-section. First arm 12 may be made of any suitable material such as plastic or metal. As shown in FIG. 2, first arm 12 may be mounted on first side 42 of tank 26 or second side 44 of tank 26 or both the first side 42 and second side 44 of tank 26.

As shown in FIGS. 2, 5, and 6, first arm 12 may include a first end 46, a second end 48, a first side 50, a second side 52, a top side 54 and a bottom side 56. As shown in FIG. 5 and FIG. 5A, first arm 12 may be mounted to support member 14 via a mounting bracket 58 which is fastened to a rail 60 (or any other suitable part) of tanker truck 16. Rail 60 may extend longitudinally from first end 38 of tank 26 to second end 40 of tank 26. First arm 12 may be mounted to mounting bracket 58 via a pivot pin 62 in any suitable manner. Pivot pin 62 may define a pivot axis X3 about which first arm 12 is rotatable from stored position 22 (FIG. 1A) to operating position 24 (FIG. 2). The pivotal motion of first arm 12 is indicated in FIGS. 2 and 5 by the arrow "A". As shown in FIG. 1A, when first arm 12 is mounted in stored position 22, first arm 12 is parallel to a side of support member 20; and particularly is parallel to rail 60 and to longitudinal axis "X1". First arm 12 has a length "L" (FIG. 1A) that is measured from first end 46 of first arm 12 to second end 48 of first arm 12. In some embodiments, length "L" may be approximately eight feet; however, length "L" of first arm 12 may be any desired length.

System 10 may further comprise a reflective mechanism 64 (FIG. 6A) that is provided on first arm 12. Reflective mechanism 64 may be engaged with first arm 12 in any suitable manner. Reflective mechanism 64 may comprise a retroreflective sheet material that is engaged on one or both of an interior surface and an exterior surface of first arm 12 using fasteners or an adhesive. Any suitable reflective material other than a retroreflective sheet material may be utilized to make first arm 12 more visible when light shines upon first arm 12.

System 10 may further comprise a light source or light mechanism 66 that is provided on first arm 12. Light mechanism 66 may comprise a light that flashes and thereby draws attention to first arm 12. Light mechanism 66 may be engaged on first arm 12 in any suitable manner or may be integrally formed with arm. Flashing light mechanism 66 may be a strobe light, particularly an amber-colored strobe light; however, it will be understood that any suitable flashing light may be utilized. Light mechanism 66 may include a dedicated power source or light mechanism 66 may be operatively engaged with the power source of truck 16 that operates other controls, such as controls 32.

As discussed earlier herein and as shown in FIG. 1A, first arm 12 is mounted to rail 60 of support member 14 adjacent first side 42 of tank 26. First arm 12 extends longitudinally from first end 46 of first arm 12 to second end 48 of first arm 12. When first arm 12 is in stored position 22, first arm 12 is parallel to rail 60 and thereby to a side of support member 14. First arm 12 may be pivoted about axis X3 (FIG. 5A) through an angle α and into operating position 24. Angle α may be ninety degrees; however angle α may be any other desired angle. First arm 12 is rotatable about pivot axis X3 (FIG. 5A) in any suitable manner and by any suitable drive mechanism. The drive mechanism involved may simply be an operator physically grasping first arm 12 and moving first arm 12 between the stored position 22 to the operating position 24. Alternatively, a motor may be provided as part of system 10 and this motor may be actuated to move first arm 12 between stored position 22 and operating position 24. One of the controls 32 may be utilized to control this motor. The drive mechanism may also include a spring-loaded bolt and/or a locking mechanism.

As shown in FIG. 2, when first arm 12 is in operating position 24, first arm 12 extends in the transverse direction from first end 46 of first arm 12 to second end 48 of first arm 12 and first arm 12 is perpendicular to rail 60 and the longitudinal axis "X1" of support member 14. First arm 12 may be positioned anywhere between the first end 38 of tank 26 and second end 40 of tank 26.

As shown in FIG. 1A, system 10 may further comprise a second arm 13 mounted to rail 60 of support member 14 adjacent first side 42 of tank 26 a distance "D" from first arm 12. Distance "D" may be any desired and suitable distance. Second arm 13 is identical to first arm 12 in both structure and function and therefor the description of first arm 12 applies equally to second arm 13. Second arm 13 extends longitudinally from first end 46 of second arm 13 to second end 48 of second arm 13. When second arm 13 is in stored position 22, second arm 13 is parallel to rail 60 and support member 14. Second arm 13 is pivotable about axis X3 (FIG. 5A) through an angle α and into operating position 24. Angle α may be ninety degrees; however angle α may be any other desired angle. Second arm 13 is rotatable about pivot axis X3 (FIG. 5A) in any suitable manner and by any suitable drive mechanism (not shown).

As shown in FIG. 2, when first arm 12 is in operating position 24, first arm 12 extends in the transverse direction from first end 46 of first arm 12 to second end 48 of first arm 12 and first arm 12 is perpendicular to rail 60 and the longitudinal axis "X1" of support member 14. First arm 12 may be positioned anywhere between the first end 38 of tank 26 and second end 40 of tank 26. As shown in at least FIG. 1C and FIG. 2, the first arm 12 may be free of any structure depending from the bottom side 56 of the second end 48 of the first arm 12. As shown in at least FIG. 1C and FIG. 2, the first arm 12 may be a cantilevered first arm 14. The first end 46 of the first arm 12 may be mounted to the support member 14. When the cantilevered first arm 12 is in the operating position 24, the cantilevered first arm 12 may be cantilevered relative to the support member 14.

As shown in FIG. 1A, a third arm 15 may be mounted to rail 60 of support member 14 adjacent first side 42 of tank 26 and adjacent fuel nozzle assembly 34. Third arm 15 may extend generally parallel to longitudinal axis "X1" and extends longitudinally from first end 46 of third arm 15 to second end 48 of third arm 15. Third arm 15 may be fixedly mounted to rail 60 such that third arm 15 is stationary and is therefor not able to move out of stored position 22. When third arm 15 is in stored position 22, third arm 15 is parallel to rail 60 and support member 14. (It will be understood that in other embodiments, third arm 15 may be mounted in a similar manner to first arm 12 or second arm 13 and be pivotable or slidable between stored position 22 and operating position 24.

With reference to FIG. 1C, system 10 as described in relationship to FIG. 1A operates in a similar manner as system 10 in relationship to FIG. 1C and thus will not be further described for purposes of brevity.

As shown in FIG. 1B, arms 12 of system 10 may be configured in accordance with a second embodiment of the present disclosure where a first arm 12 and a second arm 13 are mounted to truck 16 in such a manner that first and second arms 12, 13 are slidably movable between a stored position 68 and an operating position 70 relative to rail 60. As shown in FIG. 7, a sleeve 72 or other type of support mechanism may be engaged with rail 60 (or may be integrally formed in rail 60 or another portion of the frame of the trailer). Sleeve 72 may be fastened to rail 60 in any suitable manner. First arm 12 may be received within a bore 74 defined by sleeve 72. First arm 12 may be operative to slide into and out of bore 74 as indicated by the arrow "B". As shown in FIG. 1B, when first arm 12 is in stored position 68, second end 48 of first arm 12 may be approximately flush with first side 42 of tank 26 or with a first side surface of rail 60. As shown in FIG. 2, when first arm 12 is slidably pulled or moved out of sleeve 72 to operating position 70, first end 46 of first arm 12 may be approximately flush with first side 42 of tank 26 or first side surface of rail 60; and second end 48 may be disposed a distance remote from first side 42 of tank 26. First arm 12 is therefore always disposed in a transverse orientation (i.e., at right angles to longitudinal axis "X1"). First arm 12 may therefore be perpendicular to a side of support member 14. First arm 12 may be mounted anywhere between the first end 38 of tank 26 and second end 40 of tank 26.

As shown in FIG. 1B and FIG. 7, system 10 may further comprise a second arm 13 that is slidably engaged with a second sleeve 72; with second arm 13 being disposed within bore 74 of that second sleeve 72. When second arm 13 is in stored position 68, second end 48 of second arm 13 is approximately flush with first side 42 of tank 26. As shown in FIG. 2, when second arm 13 is slidably moved out from sleeve 72 to operating position 70, first end 46 of second arm 13 may be approximately flush with first side 42 of tank 26. Second arm 13 may be generally parallel to first arm 12 and be oriented perpendicular to a side of tank 26. Second arm 13 may be mounted anywhere between the first end 38 of tank 26 and second end 40 of tank 26.

Although particular locations and configurations of first arm 12 have been described, it is envisioned that first arm 12, second arm 13 and third arm 15 may be mounted in any suitable location, manner and configuration on tank 26.

As shown in FIG. 5, FIG. 5A, FIG. 6 and FIG. 6A, system 10 may comprise a light source 18 provided on first arm 12. Light source 18 may be in electrical communication with a power supply 19 that supplies electrical current to light source 18. Light source 18 may be any suitable source of illumination including, but not limited to, light emitting diode (LED) strips. FIG. 2 shows first arm 12 and second arm 13 in operating position 24. A light source 18 is disposed on second side 52 of first arm 12 and on second side 52 of second arm 13 in any suitable manner. Second side 52 of first arm 12 may face second side 52 of second arm 13. Light may be simultaneously emitted from second side 52 of first arm 12 towards second arm 13 and from second side 52 of second arm 13 towards first arm 12. FIG. 2 shows third arm 15 in stored position 22. A light source 18 may be disposed on first side 50 of third arm 15 in a similar manner as first arm 12 and second arm 13. Light emitted by light source 18 on third arm 15 may illuminate fuel nozzle assembly 34.

It is further envisioned that first arm 12 and second arm 13 may be adapted to emit light in any suitable manner. For example, and not meant as a limitation, light may be emitted from both sides 50, 52 of each first arm 12.

When first arm 12 or second arm 13 are moved from the stored position to the operating position, a region of the tanker truck 16 or cargo truck 116 (i.e., a region of support member 14) and the first arm 12 and/or second arm 13 defines a safety zone 20 for an operator of the truck 16, 116. FIG. 2 shows both first arm 12 and second arm 13 in the operating position 24, 70 and shows a safety zone 20 defined by the region of support member 14, first arm 12 and second arm 13. Light emitted from first arm 12 and second arm 13 illuminates and defines safety zone 20; where safety zone 20 comprises an area 76 extending away from support member 14 and between first arm 12 and second arm 13. Safety zone 20 ends generally proximate the second ends 48 of the first and second arms 12, 13. It is envisioned that an embodiment according to the present disclosure may include third arm 15 disposed adjacent fuel nozzle assembly 34. Third arm 15 may also emit light from light source 18 to generally provide illumination for fuel nozzle assembly 34 and to further illuminate and define safety zone 20.

Figure 8:
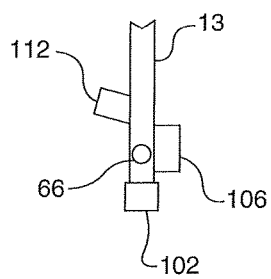
FIG. 8 is an enlarged view of the highlighted region of FIG. 3 showing the arm and showing a flashing light mechanism provided on the arm. All other components have been removed for clarity of illustration.
Figure 8A:
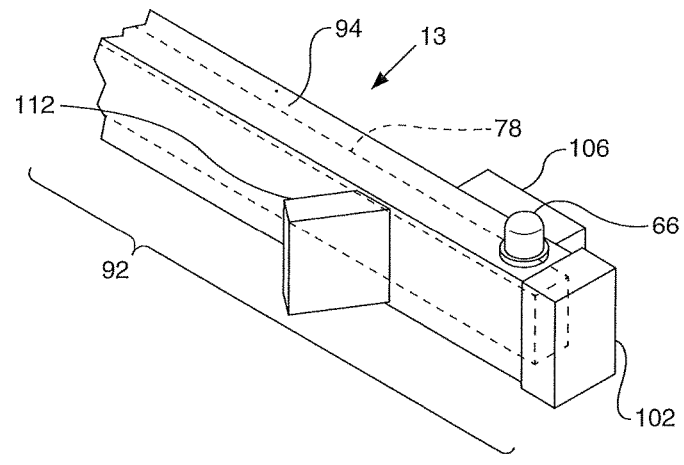
FIG. 8A is an enlarged partial perspective view of the highlighted region of FIG. 3 showing the extension member in a collapsed position and showing a flashing light mechanism provided on the arm. All other components have been removed for clarity of illustration.
Figure 9:
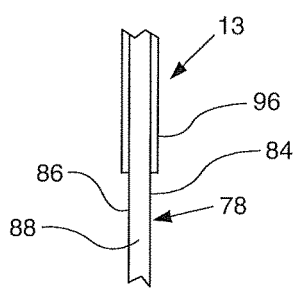
FIG. 9 is an enlarged view of the highlighted region of FIG. 4 showing the extension member in a partially extended position.
Figure 9A:
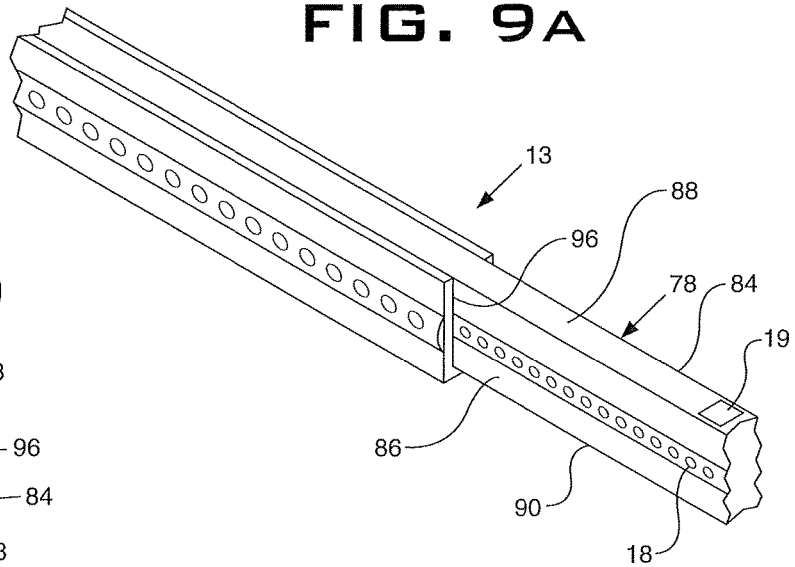
FIG. 9A is an enlarged partial perspective view of the highlighted region of FIG. 4 showing the extension member in a partially extended position.

As shown in FIG. 4, system 10 may further comprise an extension member 78 that is provided on one or both of first arm 12 and second arm 13. Extension member 78 may be extended outwardly from an associated one of first arm 12 and second arm 13 to expand area 76 of safety zone 20. Extension member 78 may include a first end 80, a second end 82, a first side 84, a second side 86, a top side 88 and a bottom side 90 (FIG. 9). Extension member 78 may be engaged with first arm 12 (or second arm 13) in any suitable manner. FIG. 8A shows extension member 78 in a collapsed position 92 and received within a bore 94 defined within first arm 12. Extension member 78 may be selectively partially withdrawn from bore 94 and extend outwardly and forwardly from second end 48 of first arm 12. (A stop may be provided within bore 94 to prevent extension member 78 from being fully withdrawn from first arm 12.) As shown in FIG. 4, when extension member 78 is in an extended position 98, first end 80 of extension mechanism 78 may be adjacent second end 48 of first arm 12 and the second end of extension member 78 is located a distance outwardly away from second end 48 of first arm 12. When extension member 78 is in extended position 98, extension member 78 extends from first end 80 of extension member 78 to second end 82 of extension member 78 in the transverse direction.

FIG. 9 shows extension member 78 may alternatively be partially extended from second end 48 of first arm 12 and being telescopically engaged with first arm 12 via a U-shaped channel 96. It is also envisioned that extension member 78 may, alternatively, be rotatably attached to second end 48 of first arm 12 in any suitable manner. In this latter instance, extension member 78 may be pivotable between collapsed position 92 and extended position 98.

As shown in FIG. 9, a light source 18 may additionally or alternatively be provided on extension member 78. This light source may be in electrical communication with power supply 19 that supplies electrical current to light source 18 on first arm 12 or on second arm 13. Light source 18 may be any suitable source of illumination including, but not limited to, light emitting diode (LED) strips or a flashing light. As shown in FIG. 9, light source 18 may be disposed on second side 82 of extension member 78 in any suitable manner. When extension member 78 is in extended position 98, extension member 78 emits light in a similar manner as the light source 18 on first arm 12 and second arm 13. It is further envisioned that extension member 78 may be adapted to emit light in any suitable manner. For example, and not meant as a limitation, light may be emitted from both sides 84, 86 of extension member 78.

As shown in FIG. 3, system 10 may further comprise an alarming system 100. Alarming system 100 may include a transmitter 102, a receiver 104 and an alarm mechanism 106 that aids in creating and defining safety zone 20. Any suitable alarm system may be utilized for this purpose. Transmitter 102 may be provided on one of first arm 12, on second arm 13, on third arm 15 or on any part of truck 16, 116 that defines the support member 14 upon which arms 12, 13, 15 are mounted. Receiver 104 may be provided on any other of first arm 12, on second arm 13, on third arm 15 or on any part of truck 16, 116 that defines the support member 14 upon which arms 12, 13, 15 are mounted. Alarm mechanism 106 may be provided on any of first arm 12, on second arm 13, on third arm 15 or on any part of truck 16, 116 that defines the support member 14 upon which arms 12, 13, 15 are mounted. Alarming system 100 is operably engaged with receiver 104.

Transmitter 102 may be a laser generator that emits a signal 108, such as a laser beam (which is also referred to herein by the reference number 108). Receiver 104 receives the signal (or laser beam 108) and receiver 104 is operably coupled with alarm mechanism 106. Receiver 104 continually monitors signal 108 to determine if there is an interruption in the signal 108. The signal 108 will be interrupted if, for example, a person other than the operator or a car moves between the second ends 48 of first arm 12 and second arm 13 and into safety zone 20. If receiver 104 detects an interruption in signal/laser beam 108, the detected interruption triggers alarm mechanism 106. Alarm mechanism 106 may include a sound emitting assembly 106 and/or a light emitting device 106 and is therefore capable of generating and broadcasting an audible and/or visual warning 110 to the operator. Audible and/or visual warning 110 may include, but is not limited to, an audible signal and/or light signal. The generated warning 110 will automatically also warn any person intruding on safety zone 20 that they have crossed into an unauthorized zone.

Other suitable alarm systems may be utilized as part of system 10 such as, but not limited to, an alarming system 100 including a transmitter 102, receiver 104, alarm mechanism 106 where the transmitter 102 is an infrared transmitter which generates an infrared signal (not shown) received by receiver 104. Alarming system 100 may also incorporate a camera 112 configured to record safety zone 20 and/or record areas (not shown) adjacent safety zone 20. Camera 112 may be mounted on truck 16, 116 or on any of first arm 12, second arm 13, and third arm 15. Another exemplary alarm system may utilize reflective surfaces, such as mirrors (not shown) to expand area 76 of safety zone 20 by reflecting signals emitted by transmitter 102 off of mirrors and towards receiver 104 in any suitable manner.

FIG. 10 shows system 210 operably coupled with tanker truck 16. System 210 may include an alarming system 212 which is illustrated as being engaged on first side 42 of tank 26 but it will be understood that alarming system 212 may alternatively or additionally be provided on second side 42 of tank 26 or at any other location on tanker truck 16 alongside which an operator may typically work on the ground. Alarming system 212 may be mounted to tanker truck 16 in any suitable manner, including, but not limited to, using fasteners and adhesives.

As shown in FIG. 10, alarming system 212 defines safety zone 220; where safety zone 220 comprises an area 222 adjacent tanker truck 16. Area 222 of safety zone 220 may be any suitable area. Alarming system 212 may include a sensor assembly 224 adapted to define a perimeter 226 of safety zone 220, which is also the boundary of area 222.

Sensor assembly 224 may be adapted to detect when an object 228, such as a person, crosses perimeter 226. Alarming system 212 may include an alarm mechanism 230 operatively engaged with sensor assembly 224. If sensor assembly 224 detects an object 228 crossing perimeter 226, sensor assembly 224 may trigger alarm mechanism 230 which generates an audible and/or visual warning 232 and/or may transmit a notification to a third party. Sensor assembly 224 may further include a camera 234 for recording safety zone 220 or areas (not shown) adjacent system 210. Camera 234 may automatically switch on if sensor assembly 224 detects object 228 crossing perimeter 226. Camera 234 may transmit recorded information to a remote computing device. In addition, alarming system 212 may transmit detection information to a remote computing device or warning system so that such detection events may be responded to monitored or recorded.

With continued reference to FIG. 10, alarming system 212 may further include an identification device 236 which may be carried on a person. Sensor assembly 224 may be adapted to detect when identification device 236 crosses from within perimeter 226 to outside of perimeter 226. If sensor assembly 224 detects identification device 236 crossing from within perimeter 226 to outside perimeter 226, sensor assembly 224 may trigger alarm mechanism 230 which generates audible and/or visual warning 232 and/or may transmit a notification to a third party. Identification device 236 may comprise any number of devices that may trigger alarm mechanism 230, including, but not limited to, radio frequency identification (RFID) tags, motion sensors or the like.

As shown in FIG. 11, alarming system 212 may include a first sensor assembly 224 and a second sensor assembly 238. First sensor assembly 224 may be mounted on tanker truck 16 in any suitable manner. Second sensor assembly 238 may be positionable a distance "D2" away from tanker truck 16. Safety zone 220 extends between first sensor assembly 224 and second sensor assembly 238. Alarming system 212 is adapted to operate in a similar manner as described above (i.e. detecting when object 228 crosses perimeter 226 and detecting when identification device 236 crosses from within perimeter 226 to outside perimeter 226) and will not be further described for purposes of brevity.

It will be understood that one or more sensor assemblies 224, 238 may be utilized in various configurations and/or arrangements to define safety zone 220. For example, and not meant as a limitation, one or more sensor assemblies 224, 238 may be provided on tanker truck 16 to define safety zone 220 adjacent tanker truck 16. Alternatively, one or more sensor assemblies 224, 238 may be provided on the ground adjacent tanker truck 16 to define safety zone 220. Still yet, one or more sensor assemblies 224, 238 may be provided a distance away from tanker truck 16 to define safety zone 220 a distance away from tanker truck 16. For example, and not meant as a limitation, one or more sensor assemblies 224, 238 may be provided adjacent an operator to define safety zone 220 around operator working on the ground or any other environment around operator.

It is envisioned that alarm mechanism 212 may have the same functionality of alarm mechanism 106, including, but not limited to, including sound emitting assembly 106 and light emitting 106.

It is further envisioned that alarming system 212 may utilize any suitable technology adapted to define perimeter 226 and detect when object 228 crosses perimeter 226 and detect when identification device 236 crosses from within perimeter 226 to outside perimeter 226, including, but not limited to, radio frequency (RF), radio frequency identification (RFID), infrared (IR), optical, motion detectors, proximity sensors, a magnetic loop/induction systems, or any other suitable systems and/or technology.

In operation, and with reference to FIG. 1A and FIG. 2, system 10 is disposed on tanker truck 16. First arm 12 is mounted to tanker truck 16 in stored position 22 in which first arm 12 is parallel to support member 14. First arm 12 is moved from stored position 22 (FIG. 1A) to operating position 24 (FIG. 2) in which first arm 12 is disposed at angle α to support member 14. In FIG. 2, angle α is ninety degrees. First arm 12 is moved from stored position 22 to operating position 24 through movement about pivot axis X3 (FIG. 5A). First arm 12 may then be locked into operating position 24 in any suitable manner. When first arm 12 is in the operating position 24, safety zone is created between a side surface of tanker truck 16 and first arm 12. This safety zone may also include alarming system 100 to monitor the safety zone created by tanker truck 16 and first arm 12.

With continued reference to FIG. 1A and FIG. 2, second arm 13 may be mounted to support member 14 a distance "D" from first arm 12. Second arm 13 is movable from a stored position 22 (FIG. 1A) to an operating position 24 (FIG. 2) in which second arm 13 is disposed at angle α to support member 14. In FIG. 2, angle α is ninety degrees. Second arm 13 is moved from stored position 22 to operating position 24 through movement about pivot axis X3 (FIG. 5A). Second arm 13 may be locked into operating position 24. When second arm 13 is moved to operating position 24, the safety zone is expanded to safety zone 20 shown in FIG. 2 and as described earlier herein.

With continued reference to FIG. 2, first arm 12 carries light source 18 that emits light generally towards second arm 13. Second arm 13 carries light source 18 that emits light generally towards first arm 12. The emitted light illuminates and defines safety zone 20.

With continued reference to FIG. 2, third arm 15 may be mounted adjacent fuel nozzle assembly 34 in stored position 22 and parallel to a side surface of truck 16. Third arm 15 is mounted such that third arm 15 is stationary and does not move out of stored position 22. Third arm 15 carries light source 18 and emits light generally towards fuel nozzle assembly 34 and within safety zone 20.

With reference to FIG. 4 and FIG. 7-FIG. 8A, system 10 incorporates extension member 78. An extension member 78 may be telescopically or slidably mounted to first arm 12 and to second arm 13. Extension members 78 may be moved from collapsed position 92 (FIG. 7A) to extended position 98 (FIG. 4). Extension member 78 may be moved from collapsed position 92 to extended position 98 through slidable movement between bore 94 or u-shaped channel 96 of first arm 12. When extension members 78 are moved to the extended position, the size of safety zone 20 is increased accordingly.

With continued reference to FIG. 4, extension member 78 may include a light source 18 that emits light in a similar manner to the light sources 18 on one or both of first arm 12 and second arm 13. This additional light further defines and illuminates area 76 of safety zone 20.

With reference to FIG. 1B, FIG. 2, FIG. 9 and FIG. 9A, and in another embodiment according to the present disclosure, first arm 12 is mounted to support member 14 in stored position 68 in which first arm 12 is perpendicular to longitudinal axis "X1" of support member 14. First arm 12 is movable between stored position 68 (FIG. 1B) and operating position 70 (FIG. 2) and parallel to transverse axis "X2"

(FIG. 2) First arm 12 is moved from stored position 68 to operating position 70 through slidable movement through bore 74 of sleeve 72. First arm 12 may be locked into operating position 24. A safety zone may be defined between a side of truck 16 and first arm 12.

With continued reference to FIG. 1B and FIG. 2, second arm 13 is mounted to support member 14 (i.e., truck 16) a distance "D" from first arm 12. Second arm 13 is mounted to truck 16 in a similar manner to first arm 12 and functions in the same manner. First arm 12 and second arm 13 as shown in FIG. 1B and FIG. 2 operate in a similar manner to first arm 12 and second arm 13 as shown in FIG. 1A and FIG. 2 as explained above, except as to manner of mounting and moving of first arm 12 and second arm 13 relative to the side of truck 16. In other words, stored position 22 and stored position 68 are different while operating position 24 and operating position 70 are the same. When the first and second arms 12, 13 shown in FIG. 1B are moved to the operating position, the safety zone 20 is defined and created by the side of truck 16, the first arm 12 and the second arm 13. Extension members 78 may be provided on the first and second arms 12, 13 shown in FIG. 1B and these may be configured and function in the same manner as has been described previously herein.

With reference to FIG. 3, alarming system 100 may be carried by first arm 12 and second arm 13 to create safety zone 20. First arm 12 may carry transmitter 102 and second arm 13 may carry receiver 104. Receiver 104 may be operably coupled to alarm mechanism 106. Transmitter 102 may emit a laser beam or other signal 108 that is received by receiver 104. Receiver 104 may continually monitor laser beam 108 to determine if there is an interruption in laser beam 108 when a person or vehicle moves across the same. If receiver 104 detects an interruption in laser beam 108, the detected interruption triggers alarm mechanism 106 which generates an audible and/or visual warning 110 as previously described. First arm 12 and second arm 13 may carry a camera 112 for recording safety zone 20 or areas (not shown) adjacent system 10. Camera 112 may automatically switch on if an interruption in laser beam 108 is detected. Camera 112 may transmit recorded information to a remote computing device. In addition, alarming system 100 may transmit interruption information to a remote computing device or warning system so that such interruption events may be monitored or recorded.

As one of ordinary skill in the art would understand, the components of alarming system 100 may be arranged in any suitable configuration. For example, first arm 12 may carry receiver 104 and second arm 13 may carry transmitter. Further, alarm mechanism 106 and camera 112 may be placed in any suitable position.

In operation, and with reference to FIG. 10 and FIG. 11, system 210 is disposed on tanker truck 16. Alarming system 212 is engaged on first side 42 of tank 26. Alarming system 212 defines safety zone 220 adjacent tanker truck 16. Alarming system 212 comprises sensor assembly 224 and alarm mechanism 230. Sensor assembly 224 defines perimeter 226 of safety zone 220. Sensor assembly 224 detects object 228, such as a person, crossing perimeter 226. When sensor assembly 224 detects object 228 crossing perimeter 228, sensor assembly 224 activates alarm mechanism 230 which generates audible and/or visual warning 232 and/or may transmit a notification to a third party. System 210 may further comprise identification device 236. Sensor assembly 224 detects when identification device 236 crosses from within perimeter 226 to outside perimeter 226. When sensory assembly 224 detects identification device 236 crossing from within perimeter 226 to outside perimeter 226, sensor assembly 224 activates alarm mechanism 230 which generates audible and/or visual warning 232 and/or may transmit a notification to a third party. System 210 may further comprise a first sensor assembly 224 and a second sensor assembly 238. First sensor assembly 224 is mounted on tanker truck 16 and second sensor assembly 238 is positioned a distance "D2" away from tanker truck 16. Safety zone 220 is defined between first sensor assembly 224 and second sensor assembly 238.

An exemplary method may be better appreciated with reference to a flow diagram. While for purposes of simplicity of explanation, the illustrated methodology is shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 12:
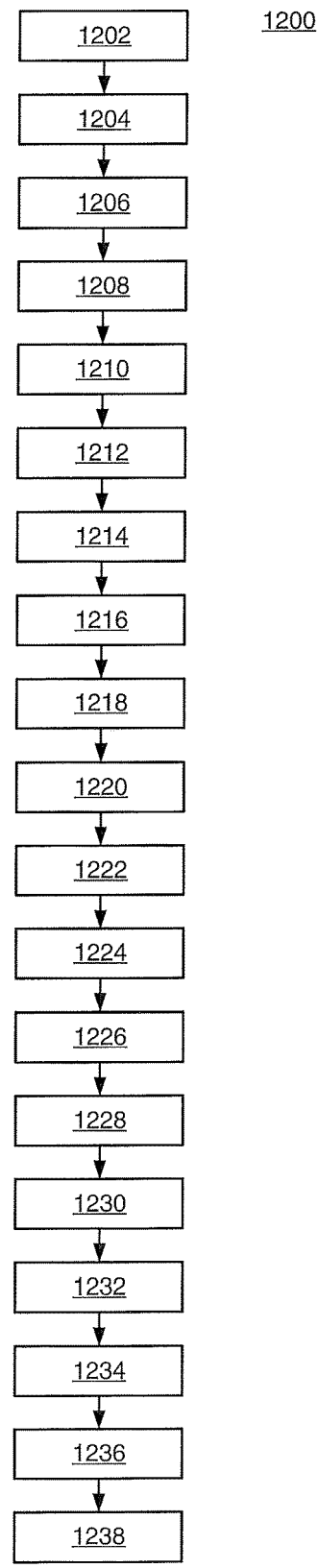
FIG. 12 is a flowchart depicting an exemplary method for creating the deployable alarming and safety zone.

In accordance with one aspect of the present disclosure, FIG. 12 depicts a flowchart of an exemplary method 1200 for creating safety zone 20. Method 1200 first provides a support member, which is shown generally at 1202. Method 1200 mounts first end 46 of first arm 12 to support member 14, which is shown generally at 1204. Method 1200 moves first arm 12 from stored position 22 to operating position 24, which is shown generally at 1206. Method 1200 creates safety zone 20 between support member 14 and first arm 12, which is shown generally at 1208. Method 1200 may provide that the step of providing support member 14 further comprises providing a tanker truck 16 as support member 14, which is shown generally at 1210.

Method 1200 further includes mounting first end 46 of second arm 13 to support member 14 a distance "D" away from first end 46 of first arm 12, which is shown generally at 1212. Method 1200 moves second arm 13 from stored position 22 to operating position 24, which is shown generally at 1214. Method 1200 further includes creating safety zone 20 between support member 14, first arm 12 and second arm 13, which is shown generally at 1216.

Method 1200 further includes mounting light source 18 onto at least one of first arm 12, second arm 13 and support member 14, which is shown generally at 1218. Method 1200 further includes emitting light from light source 18 when first arm 12 and second arm 13 are in operating position 24, which is shown generally at 1220. Method 1200 further includes illuminating safety zone 20 with the emitted light, which is shown generally at 1222.

Method 1200 further includes providing fuel nozzle assembly 34 on first side 42 of tank 26, which is shown generally at 1224. Method 1200 further includes mounting third arm 15 on first side 42 of tank 26 adjacent fuel nozzle assembly 34, which is shown generally at 1226. Method 1200 further includes providing light source 18 on third arm 15, which is shown generally at 1228. Method 1200 further includes illuminating fuel nozzle assembly 34 with light emitted from light source 18, which is shown generally at 1230.

Method 1200 further includes providing extension member 78 on first arm 12, which is shown generally at 1232. Method further includes moving extension member 78 from collapsed position 92 to extended position 98, which is shown generally at 1234. Method 1200 further includes increasing a length of first arm 12 when extension member 78 is in extended position 98, which is shown generally at 1036. Method 1200 further provides that the step of mounting the first arm 12 to support member 14 further comprises rotatably mounting first arm 12 to support member 14, which is shown generally at 1238.

Figure 13:
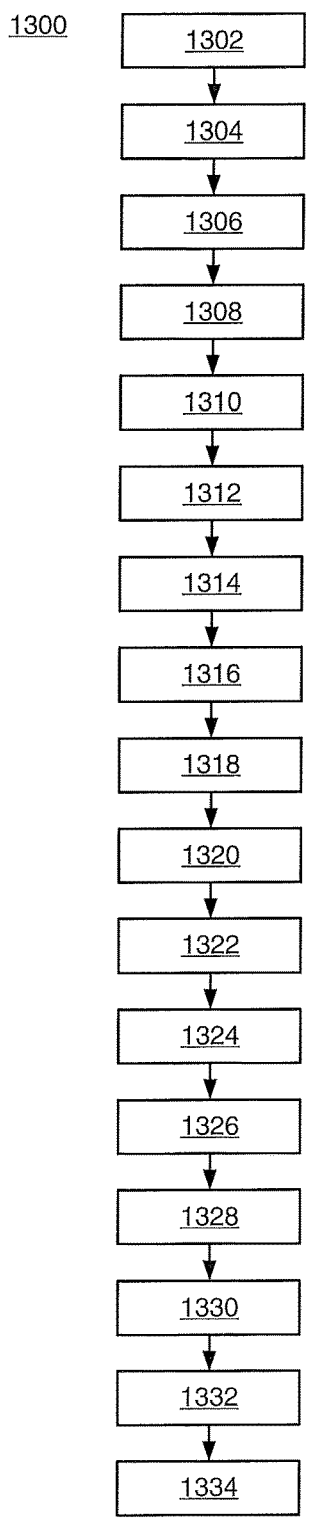
FIG. 13 is a flowchart depicting another exemplary method for creating the deployable alarming and safety zone.

In accordance with one aspect of the present disclosure, FIG. 13 depicts a flowchart of another exemplary method 1300 for creating safety zone 20. Method 1300 first provides a support member, which is shown generally at 1302. Method 1300 mounts first end 46 of first arm 12 to support member 14, which is shown generally at 1304. Method 1300 moves first arm 12 from stored position 22 to operating position 24, which is shown generally at 1306. Method 1300 provides an alarming system 100 on one of first arm 12 and support member 14, which is shown generally at 1308. Method 1300 arms alarming system 100 as first arm 12 is moved from stored position 22 to operating position 24, which is shown generally at 1310. Method 1300 moves first arm 12 from operating position 24 to stored position 22, which is shown generally at 1312. Method 1300 disarms alarming system 100 as first arm 12 is moved from operating position 24 to stored position 22. Method 1300 may provide that the step of providing support member 14 further comprises providing a tanker truck 16 as support member 14, which is shown generally at 1314.

Method 1300 further includes mounting first end 46 of second arm 13 to support member 14 a distance "D" away from first end 46 of first arm 12, which is shown generally at 1316. Method 1300 moves second arm 13 from stored position 22 to operating position 24, which is shown generally at 1318. Method 1300 includes providing alarming system 100 on at least one of first arm 12, second arm 13 and support member 14, which is shown generally at 1320. Method 1300 includes arming alarming system 100 as first arm 12 is moved from stored position 22 to operating position 24, which is shown generally at 1322. Method 1300 may provide that the step of providing alarming system 100 on one of first arm 12, second arm 13 and support member 14 further comprises providing transmitter 102 on first arm 12, which is shown generally at 1324. Method 1300 further includes providing receiver 104 on second arm 13, which is shown generally at 1326. Method 1300 includes operably engaging alarm mechanism 106 with receiver 104, which is shown generally at 1328. Method 1300 includes detecting an interruption in a signal, such as a laser beam 108, transmitted from transmitter 102 to receiver 104, which is shown generally at 1330. Method 1300 includes activating alarm mechanism 106 when the interruption in the signal is detected, which is shown generally at 1332. Method 1300 includes generating at least one of audible warning 110 or visual warning 110, which is shown generally at 1334.

In accordance with one aspect of the present disclosure, FIG. 14 depicts a flowchart of an exemplary method 1400 for creating safety zone 220. Method 1400 first provides tanker truck 16, which is shown generally at 1402. Method 1400 provides alarming system 212 which defines safety zone 220 adjacent tanker truck 16, which is shown generally at 1404. Method 1400 further includes arming alarming system 212, which is shown generally at 1406. Method 1400 may provide that alarming system 212 comprises sensor assembly 224, which is shown generally at 1408. Method 1400 may provide operatively coupling sensor assembly 224 to tanker truck 16, which is shown generally at 1410. Method 1400 may provide that alarming system 212 comprises alarm mechanism 230, which is shown generally at 1412. Method 1400 may provide operatively engaging alarm mechanism 230 with sensor assembly 224, which is shown generally at 1414.

Method 1400 may provide that safety zone 220 comprises perimeter 226 defined by sensor assembly 224, which is shown generally at 1416. Method 1400 may provide activating alarm mechanism 230 which generates audible and/or visual warning 232 and/or may transmit a notification to a third party when sensor assembly 224 detects object 228 crossing perimeter 226, which is shown generally at 1418. Method 1400 may further provide identification device 236, which is shown generally at 1420. Method 1400 may provide activating alarm mechanism 230 which generates audible and/or visual warning 232 and/or may transmit a notification to a third party when sensor assembly 224 detects identification device 236 crossing from within perimeter 226 to outside of perimeter 226, which is shown generally at 1422.

Method 1400 may provide that alarming system 212 comprises first sensor assembly 224 and second sensor assembly 238, which is shown generally at 1424. Method 1400 may provide mounting first sensor assembly 224 on tanker truck 16, which is shown generally at 1426. Method 1400 may provide positioning second sensor assembly 238 a distance "D2" away from tanker truck 16, which is shown generally at 1428. Method 1400 may provide that safety zone 220 extends between first sensor assembly 224 and second sensor assembly 238, which is shown generally at 1430.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. For example, and not meant as a limitation, while arms 12 have been described as being parallel with support member 14 when in stored position 22 and as pivoting and/or sliding horizontally in the transverse direction when moved to operating position 24, it is understood that arms 12 may be mounted so that arms 12 are vertical and perpendicular to support member 14 and pivot away from support member 14 from the vertical position to a horizontal position to create safety zone 20. Still further, if first arm 12 and second arm 13 are mounted on a rear end of a truck 16 then arms 12, 13 may be in a stored position parallel to transverse axis "X2" (FIG. 2) and may be moved to an operating position that is parallel to longitudinal axis "X1".

More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

An embodiment is an implementation or example of the present disclosure. Reference in the specification to "an embodiment," "one embodiment," "some embodiments," "one particular embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," or "other embodiments," or the like, are not necessarily all referring to the same embodiments.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the preferred embodiment of the disclosure are an example and the disclosure is not limited to the exact details shown or described.

The invention claimed is:

1. A deployable alarming and safety zone system comprising:
   a support member;
   a first arm including a first end and a second end; wherein the first end is mounted to the support member; wherein the first arm is movable between a stored position and an operating position;
   a second arm including a first end and a second end; wherein the first end is mounted to the support member; wherein the second arm is movable between a stored position and an operating position; and
   an alarming system including a transmitter, a receiver, and an alarm mechanism; wherein the transmitter is provided on the second end of one of the first arm and the second arm; wherein the receiver is provided on the second end of the other of the first arm and the second arm; wherein the receiver is coplanar with the transmitter; wherein the alarm mechanism is provided on one of the support member, the first arm, and the second arm; wherein the support member, the first arm, the second arm, and the alarming system define an alarmed safety zone while the first arm and the second arm are in the operating position.

2. The deployable alarming and safety zone of claim 1, wherein when the first arm is moved from the stored position to the operating position the first arm is adjusted from a first angle relative to the support member to a second angle relative to the support member, wherein the second angle is greater than the first angle.

3. The deployable alarming and safety zone of claim 1, wherein when the first arm is moved from the stored position to the operating position the first arm is adjusted from a first angle relative to the support member to a second angle relative to the support member, wherein the second angle is the same as the first angle.

4. The deployable alarming and safety zone of claim 1, wherein the support member is a truck.

5. The deployable alarming and safety zone of claim 4, wherein the truck includes a first end and a second end defining an axis therebetween, and wherein the first arm is disposed between the first end and the second end of the truck.

6. The deployable alarming and safety zone of claim 1, wherein when the second arm is moved from the stored position to the operating position the second arm is adjusted from a first angle relative to the support member to a second angle relative to the support member, wherein the second angle is greater than the first angle.

7. The deployable alarming and safety zone of claim 1, wherein when the second arm is moved from the stored position to the operating position the second arm is adjusted from a first angle relative to the support member to a second angle relative to the support member, wherein the second angle is the same as the first angle.

8. The deployable alarming and safety zone of claim 1, wherein the transmitter emits a light beam; and wherein the light beam is received by the receiver.

9. The deployable alarming and safety zone of claim 1, wherein the alarm mechanism further comprises at least one of a light source and a sound emitting assembly.

10. The deployable alarming and safety zone of claim 9, wherein the light source is one of a flashing light and a laser beam.

11. The deployable alarming and safety zone of claim 1, wherein the first arm is at least one of rotatably and slidably mounted to the support member.

12. The deployable alarming and safety zone of claim 1, further comprising:
a camera provided on at least one of the support member, the first arm, and the second arm.

13. The deployable alarming and safety zone of claim 1, further comprising:
an extension member including a first end and a second end provided on the first arm; wherein the extension member extends outwardly from the second end of the first arm; and wherein the extension member is movable between a collapsed position and an extended position relative to the first arm; and wherein the transmitter is provided on the second end of one of the first arm, the second arm, and the extension member; wherein the receiver is coplanar with the transmitter; and wherein the alarm mechanism is provided on one of the support member, the first arm, the second arm, and the extension member.

14. A method for creating a deployable alarming and safety zone comprising:
mounting a first end of a first arm to a support member;
mounting a first end of a second arm to the support member;
engaging a transmitter with a second end of one of the first arm and the second arm;
engaging a receiver with a second end of the other of the first arm and the second arm; wherein the transmitter is coplanar with the receiver;
engaging an alarm mechanism with one of the support member, the first arm, and the second arm; and
deploying an alarmed safety zone adjacent the support member.

15. The method for creating a deployable alarming and safety zone of claim 14, wherein the step of deploying the alarmed safety zone adjacent the support member further comprises:
moving the first arm from a stored position to an operating position;
moving the second arm from a stored position to an operating position;
and
arming the alarming system as the first arm and the second arm are moved from the stored position to the operating position.

16. The method for creating a deployable alarming and safety zone of claim 15, wherein when the first arm is moved from the stored position to the operating position the first arm is adjusted from a first angle relative to the support member to a second angle relative to the support member, wherein the second angle is greater than the first angle; and wherein when the second arm is moved from the stored position to the operating position the second arm is adjusted from a first angle relative to the support member to a second angle relative to the support member, wherein the second angle is greater than the first angle.

17. The method for creating a deployable alarming and safety zone of claim 15, wherein the step of providing a support member further comprises:
providing a truck as the support member.

18. The method for creating a deployable alarming and safety zone of claim 14, further
further comprising:
detecting an interruption in a signal transmitted from the transmitter to the receiver,
activating the alarm mechanism when the interruption in the signal is detected; and
generating at least one of an audible warning and a visual warning.

* * * * *